(12) United States Patent
Ho et al.

(10) Patent No.: US 12,170,597 B2
(45) Date of Patent: Dec. 17, 2024

(54) INTEGRATED DEVELOPMENT ENVIRONMENT FOR DEVELOPMENT AND CONTINUOUS DELIVERY OF CLOUD-BASED APPLICATIONS

(71) Applicant: Humana Inc., Louisville, KY (US)

(72) Inventors: Tom Ho, San Jose, CA (US); Guan Wang, Sunnyvale, CA (US); Subramanyam Nakka, Dallas, TX (US)

(73) Assignee: Humana Inc., Louisville, KY (US)

( * ) Notice: Subject to any disclaimer, the term of this patent is extended or adjusted under 35 U.S.C. 154(b) by 138 days.

(21) Appl. No.: 17/961,014

(22) Filed: Oct. 6, 2022

(65) Prior Publication Data
US 2023/0110722 A1    Apr. 13, 2023

Related U.S. Application Data

(60) Provisional application No. 63/253,844, filed on Oct. 8, 2021.

(51) Int. Cl.
*G06F 8/35*    (2018.01)
*G06F 8/77*    (2018.01)
(Continued)

(52) U.S. Cl.
CPC .............. *H04L 41/147* (2013.01); *G06F 8/35* (2013.01); *G06F 8/77* (2013.01); *G06N 20/00* (2019.01);
(Continued)

(58) Field of Classification Search
CPC ... H04L 47/781; H04L 41/147; H04L 63/145; H04L 67/1004; G06F 9/547; G06F 40/216; G06F 8/77; G06F 8/35; G06N 20/00
See application file for complete search history.

(56) References Cited

U.S. PATENT DOCUMENTS 11,201,835 B1 * 12/2021 Roberts ................ H04L 47/781
2018/0013772 A1 * 1/2018 Schmidtler ........... H04L 63/145
(Continued)

OTHER PUBLICATIONS

Liu et al, CN 110149396A, (translation), Aug. 20, 2019, 17 pgs <CN_110149396A.pdf>.*
(Continued)

*Primary Examiner* — Tuan A Vu
(74) *Attorney, Agent, or Firm* — Standley Law Group LLP; Jeffrey S. Standley; Adam J. Smith

(57) ABSTRACT

A system implements a cloud-based digital platform allows developers to build new applications/services and then deploy to cloud platforms among continuous deployment, A/B test, blue/green deployment, and canary deployment. The system configures a service mesh on top of a cluster of computers. The system initializes a new service via templates that include common libraries, security scan pipeline, monitoring as code pipeline, and code coverage management for internal policy compliances, as well automated cloud resources request and provisioning. One or more proxy services, that extract data from the data sources using filters, can be executed. The system may use machine learning based models that are trained using the data extracted by the proxy service. The system allows automatic provisioning, computation orchestration, storage requests, and artificial intelligence insight feedback, as well as automated self-services to navigate complex systems and reduce on-boarding times of the platform.

20 Claims, 10 Drawing Sheets

(51) Int. Cl.
    *G06N 20/00*     (2019.01)
    *H04L 41/147*     (2022.01)
    *G06F 9/54*     (2006.01)
    *G06F 40/216*     (2020.01)
    *H04L 9/40*     (2022.01)
    *H04L 47/78*     (2022.01)
    *H04L 67/1004*     (2022.01)

(52) U.S. Cl.
    CPC ............ *G06F 9/547* (2013.01); *G06F 40/216* (2020.01); *H04L 47/781* (2013.01); *H04L 63/145* (2013.01); *H04L 67/1004* (2013.01)

(56) References Cited

U.S. PATENT DOCUMENTS

| | | | |
|---|---|---|---|
| 2019/0334822 A1* | 10/2019 | Larumbe | H04L 41/147 |
| 2020/0280612 A1* | 9/2020 | Boeker | G06F 9/547 |
| 2020/0351332 A1* | 11/2020 | Palladino | H04L 67/1004 |
| 2021/0004460 A1* | 1/2021 | Subbarayan | G06F 40/216 |

OTHER PUBLICATIONS

Gonguet Vincent, CN 113169886, (translation), Jul. 23, 2021, 46 pgs <CN_113169886.pdf>.*

* cited by examiner

INTEGRATED DEVELOPMENT ENVIRONMENT FOR DEVELOPMENT AND CONTINUOUS DELIVERY OF CLOUD-BASED APPLICATIONS

CROSS-REFERENCE TO RELATED APPLICATION

This application claims the benefit of U.S. Provisional Application No. 63/253,844, filed on Oct. 8, 2021, which is incorporated by reference in its entirety.

FIELD OF INVENTION

This disclosure concerns development, deployment, and continuous integration and continuous delivery of online applications on cloud platforms.

BACKGROUND

Development of applications that involve interactions between various services and build high level functionality using components such as machine learning and neural networks is complex. Such applications are being increasingly being developed on cloud platforms. Such applications are updated on a regular basis and are deployed on a regular basis on such cloud platforms. Integrating such applications is complex and requires a developer to have understanding of several different components and platforms. Furthermore, the developer needs to understand how to manage different types of infrastructures for example, databases, clusters of servers, cache, messaging platforms, and so on. Developers need to interact with various teams that have knowledge of different components. Such interaction typically slows down the development process. Furthermore, there are issues with integration such diverse set of components and deployment of these components. As a result, development of such applications is complex and even simple applications can take several months to develop, test, and deploy.

SUMMARY

A system maintains services on a cloud platform and allows developers to build new applications and services for deployment on the cloud platform. For example, services or applications may be deployed to a cloud platform using continuous deployment, A/B test, blue/green deployment, canary deployment, and so on. The system configures a service mesh comprising services on a cloud platform. According to an embodiment, the system initializes a new service via templates that include common libraries, security scan pipeline, monitoring as code pipeline, and code coverage management for internal policy compliances, as well automated cloud resources request and provisioning. The services of the service mesh receive data from multiple data sources. The system initializing a new service based on a machine learning based model. The system initializes parameters of the machine learning based model. One or more proxy services are executed on the cloud platform. Each proxy service is configured to perform following steps. The proxy service extracts feature data from the plurality of data sources using filters. A filter is configured to extract a subset of data from the data sources. The extracted feature data is provided for training the machine learning based model. The new service is configured on the cloud platform and executed the trained machine learning based model. The new service generates derived data based on execution of the trained machine learning based model. The system extends the service mesh by including the configured new service in the service mesh and including the derived data in a data source of the plurality of data sources.

According to an embodiment, the system trains a machine learning based model to predict a score indicating a measure of expected load on a system associated with the service mesh. If the system determines a change in load on the system exceeding a threshold value based on the predictions of the machine learning based model, the system may send an alert responsive to predicting a change in load on the system exceeding a threshold value. According to other embodiments, the system sends instructions to the cloud platform to reconfigure computing resources associated with the system.

According to various embodiments, the features extracted by the system for providing as input to the machine learning based model include a feature representing a measure of interactions with a service, a feature representing a measure of interactions with a group of services, a feature f1 representing a measure m1 of interactions with a service and a feature f2 representing a measure m2 of interactions with a group of services.

The benefits of the system include auto provisioning, computation orchestration, storage requests, and AI (artificial intelligence) insight feedback, and automated self-services to navigation of complex systems, thereby reducing on-boarding times of the platform.

The techniques disclosed herein may be implemented as computer-implemented methods, computer instructions stored on non-transitory computer readable storage medium, and computer systems comprising computer processors and non-transitory computer readable storage medium.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
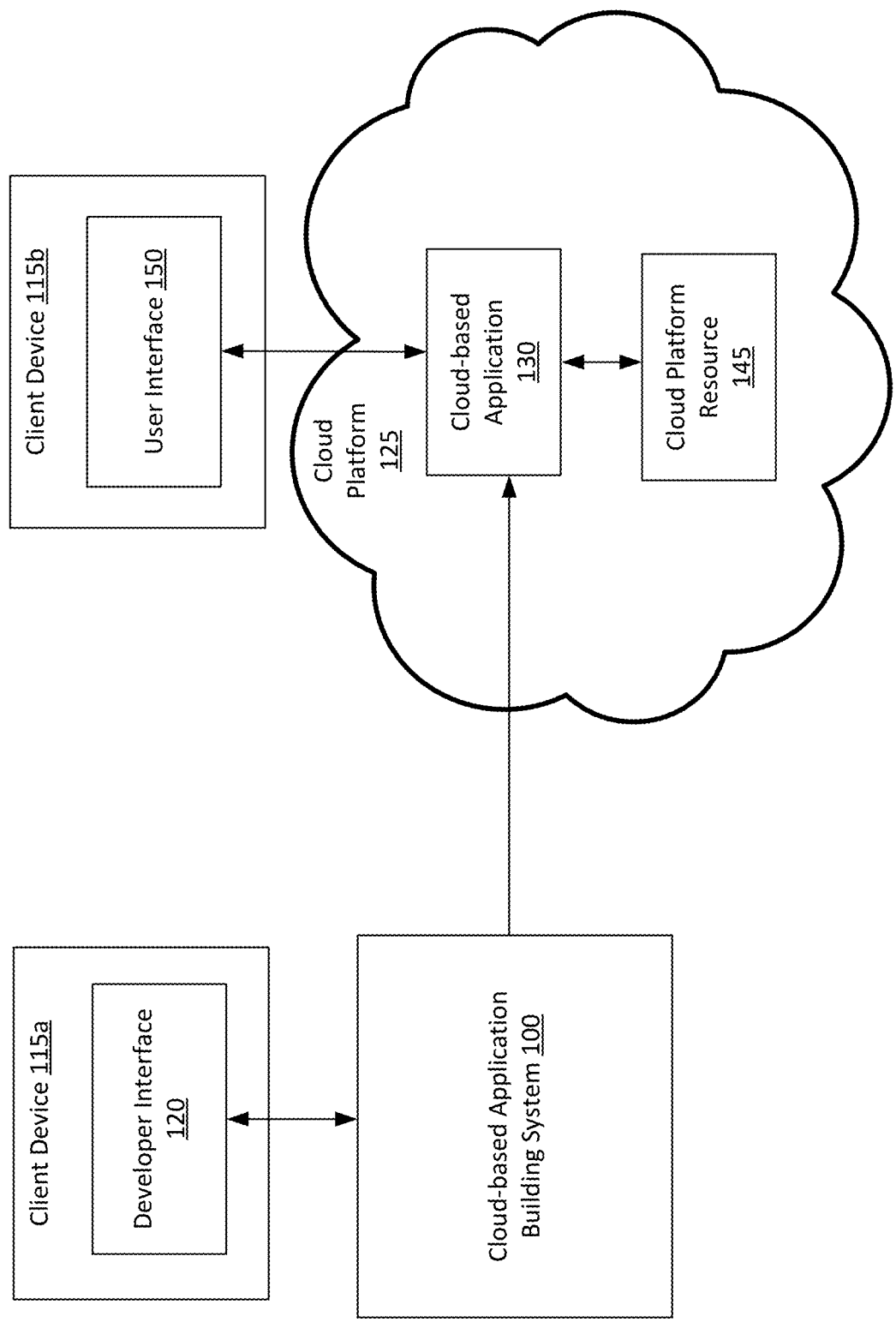
FIG. 1 illustrates the overall system environment for developing and deploying cloud-based applications using the cloud-based application building system, according to an embodiment.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

A system according to various embodiments implements a cloud-based digital platform that may be used for various applications such as digital health applications. The system allows developers to build new applications/services and then deploy the new applications to a cloud platform using continuous deployment, A/B test, blue/green deployment, canary deployment, and so on. The platform configures a service mesh on top of a cluster of computers, for example, a Kubernetes cluster. The system initializes a new service via templates that include common libraries, security scan pipeline, monitoring as code pipeline, and code coverage management for internal policy compliances, as well automated cloud resources request and provisioning. One or more proxy services, that extract data from the data sources using filters, can be executed. The system may use machine learning based models that are trained using the data extracted by the proxy service. One of the benefits of the system in addition to auto provisioning, computation orchestration, storage requests, and AI (artificial intelligence) insight feedback, is to provide automated self-services to navigate complex systems and reduce on-boarding times of the platform.

The system according to various embodiments, allows developers to efficiently build applications, for example, cloud-based applications. An example online application developed using the system utilizes various cloud features such as cloud platform based data sources such as databases and big data sources, communication systems such as telephony systems, machine learning based models, API gateways, and so on. Teams of developers can test and launch applications and learn efficiently at a rapid pace. The system reduces duplicated and wasted effort across teams and provides standardized capabilities. The system provides consistent and integrated experiences for developers. The system further provides risk and regulatory compliance for sensitive information and enables reliability through use of standard patterns and automation of processes.

The system disclosed herein may be referred to as a cloud-based application building system or an integrated development environment for cloud platform based applications. According to an embodiment, the cloud-based application building system is used for health care management systems and is referred to herein as a digital health platform (DHP). The use of the term DHP does not indicate that the techniques are limited to health care domain and are applicable to any other domain.

The system allows developers to directly use capabilities provided by the platform using a self-service model. Tasks that take several months via conventional techniques can be performed using the system as disclosed in hours or at most days. The system allows developers to create new products or services by leveraging existing platform capabilities (often via domain driven micro services/APIs). The system also allows external teams to contribute code and functionality that extends a platform's capabilities.

The system acts as an exchange platform that enables producer teams to build domain driven microservices as modern applications. Independent engineering teams can consume these reusable microservices to build more services. System provides standard identity and access management controls. System allows development without backlog coupling. Developers can publish or consume services in fully managed environment via self-service without having to wait for other teams.

The system also acts as a maker platform that facilitates accelerating creation and hosting of multiple experience apps from multiple producers. Independent engineering teams create unrelated applications/user experiences. System allows development without backlog coupling. Makers can use the system to autonomously create their own applications using the platform in a fully managed environment via self-service. The platform supports discretely consumable capabilities that enable construction of a wide verity of applications.

System Overview

FIG. 1 illustrates the overall system environment for developing and deploying cloud-based applications using the cloud-based application building system, according to an embodiment. The system environment comprises a cloud-based application building system 100 a developer interface 120, one or more client devices 115*a*, 115*b*, and a cloud platform 125. The cloud-based application building system 100 includes various software modules that allow developers to interact with the cloud-based application building system 100 to build a cloud-based application. The cloud platform 125 provides computing resources, such as storage, computing resources, applications, and so on, on an on-demand basis via a public network such as internet. Cloud platforms allow organizations to minimize upfront costs to set up computing infrastructure and also allow organizations to get applications up and running faster with less maintenance overhead. Cloud platforms also an organization to adjust computing resources to fluctuating and unpredictable demands. Enterprises can create a data center using a cloud platform for use by users of the enterprise. Examples of cloud platform 125 include AWS (AMAZON WEB SERVICES), GOOGLE cloud platform, MICROSOFT AZURE.

A developer may interact with the cloud-based application building system 100 using a developer interface that executes on a client device 115*a*, 115*b*. The cloud-based application building system 100 generates one or more software artifacts for testing or deploying a cloud-based application 130 on the cloud platform 125. The cloud-based application building system 100 sends the software artifacts generated on the cloud platform 125 to deploy the cloud-based application 130 on the cloud platform 125. The cloud-based application 130 may use one or more cloud platform resources 145, for example, data stores or services running on the cloud platform 125. The cloud-based application 130 may be accessed by end users via a user interface 150 that executes on a client device 115*b*. In an embodiment, the cloud-based application building system 100 allows developers to build cloud-based applications that support security and governance features. The cloud-based application building system 100 accelerates the development process such that applications that typically take developers several months or almost a year to develop and deploy can be developed and deployed using the cloud-based application building system 100 within days.

Client devices may be used by a user for interacting with the data pipeline generation system 100. A client device can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device can be any device having computer functionality, such as a personal digital assistant (PDA), mobile telephone, smartphone, wearable device, etc.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

The interactions between the client devices and the online system are typically performed via a network, for example, via the Internet. The network enables communications between the client device 115a, 115b, the cloud-based application building system 100, and the cloud platform 125. Although the cloud-based application building system 100 and the cloud platform 125 are shown as separate systems in FIG. 1, in other embodiments, one or more components of the cloud-based application building system 100 may be executed on the cloud platform 125. Furthermore, steps of the various processes described herein may be executed on the cloud platform 125 or on a system separate from the cloud platform 125.

In one embodiment, the network uses standard communications technologies and/or protocols. The data exchanged over the network can be represented using technologies and/or formats including the hypertext markup language (HTML), the extensible markup language (XML), YAML, JSON (JavaScript object notation), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

Figure 2:
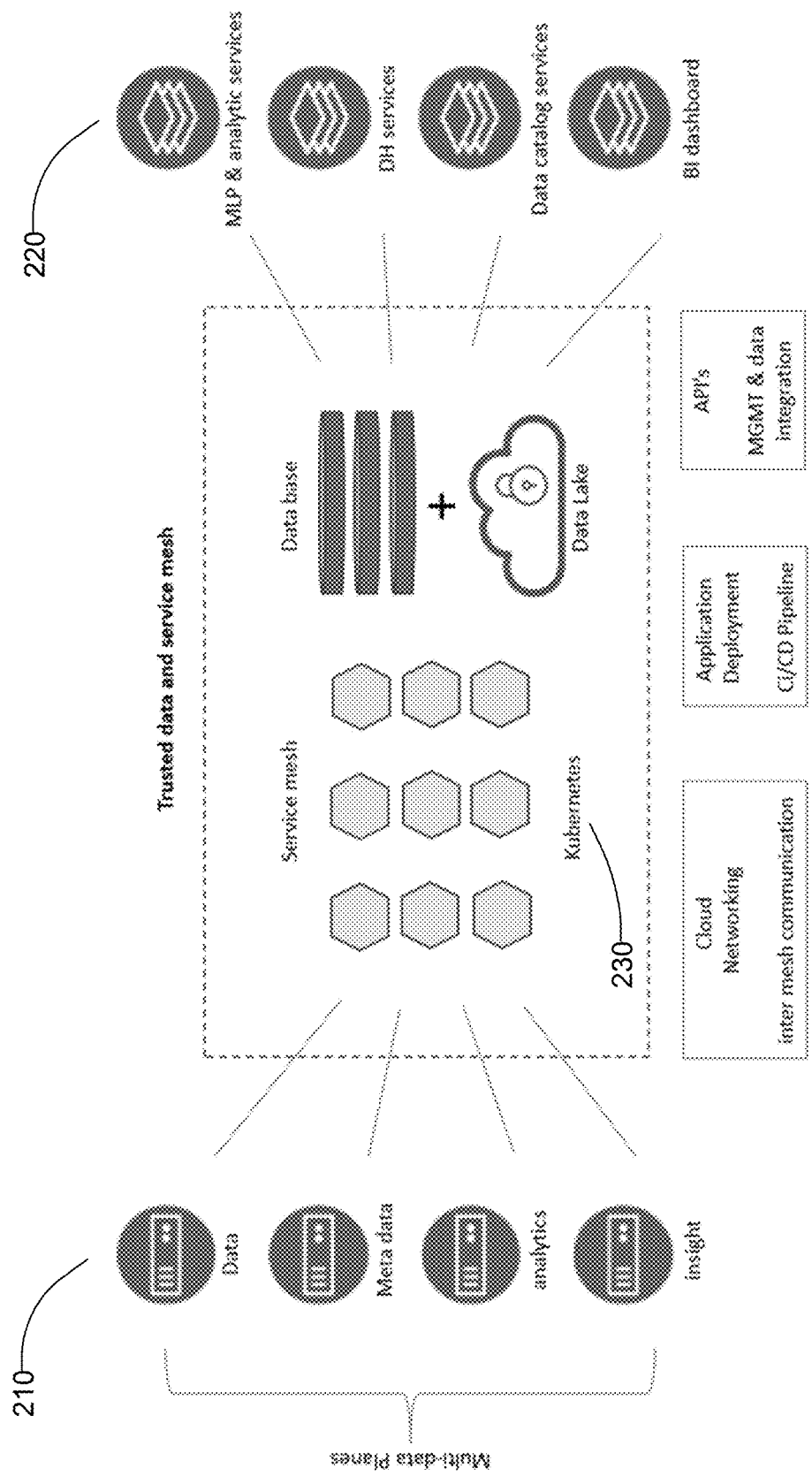
FIG. 2 illustrates data and service mesh architecture build using the cloud-based application building system, according to an embodiment.

FIG. 2 illustrates data and service mesh architecture build using the cloud-based application building system, according to an embodiment. The cloud-based application building system uses a combination of data and service mesh. The system supports a multi-data planes 210 (e.g., data plane, metadata plane, analytics plane, and insight plane) that connect various components. Accordingly, the data that is processed by an application built using the cloud-based application building system may include raw data extracted from data sources, metadata extracted from data sources, analytics data that may be based on historical data that is processed by analytics systems, an insight data that is inferred from saw data and metadata. The data may be stored in databases or data lakes. The system uses data product for distributed data ownership.

The cloud-based application building system uses various services 220 including machine learning and analytic services, digital application services, data catalog services, business intelligence dashboard, and so on. The service mesh is built on a cluster of servers 230, for example, a Kubernetes cluster that hosts various services including micro-services and other services. The cloud-based application building system uses cloud networking for inter-mesh communications. The cloud-based application building system uses application deployment using CI/CD pipeline. The cloud-based application building system uses APIs for management and data integration. The service mesh supports self-service by users such as developers and operational people and also manages lifecycle of various services. A developer can configure various data sources and services together to build (or assemble) a microservices based application. The application may be another service that is added to the system for future use by other developers. The developer specifies a configuration file that specifies the various components used by the target application as well as their interconnections. The interconnections specify which services or data sources feed into other services. For example, an application specification received from a developer may configure an application that uses a set of machine learning services to build a hierarchy of machine learning services comprising a plurality of levels such that machine learning services at one level provide inputs for machine learning services at the next level and so on. The system may initialize a service based on a machine learning based model. The initialization of the service comprises initializing parameters of the machine learning based model. The machine learning service at the root level provides results that are used by the application, for example, to make recommendations, predictions, scoring, and so on. A service may interact with another service using a network connection, for example, TCPIP connection. The machine learning model may be trained to predict various values, for example, the machine learning based model is trained to predict a score indicating a measure of expected load on a system associated with the service mesh.

Figure 3:
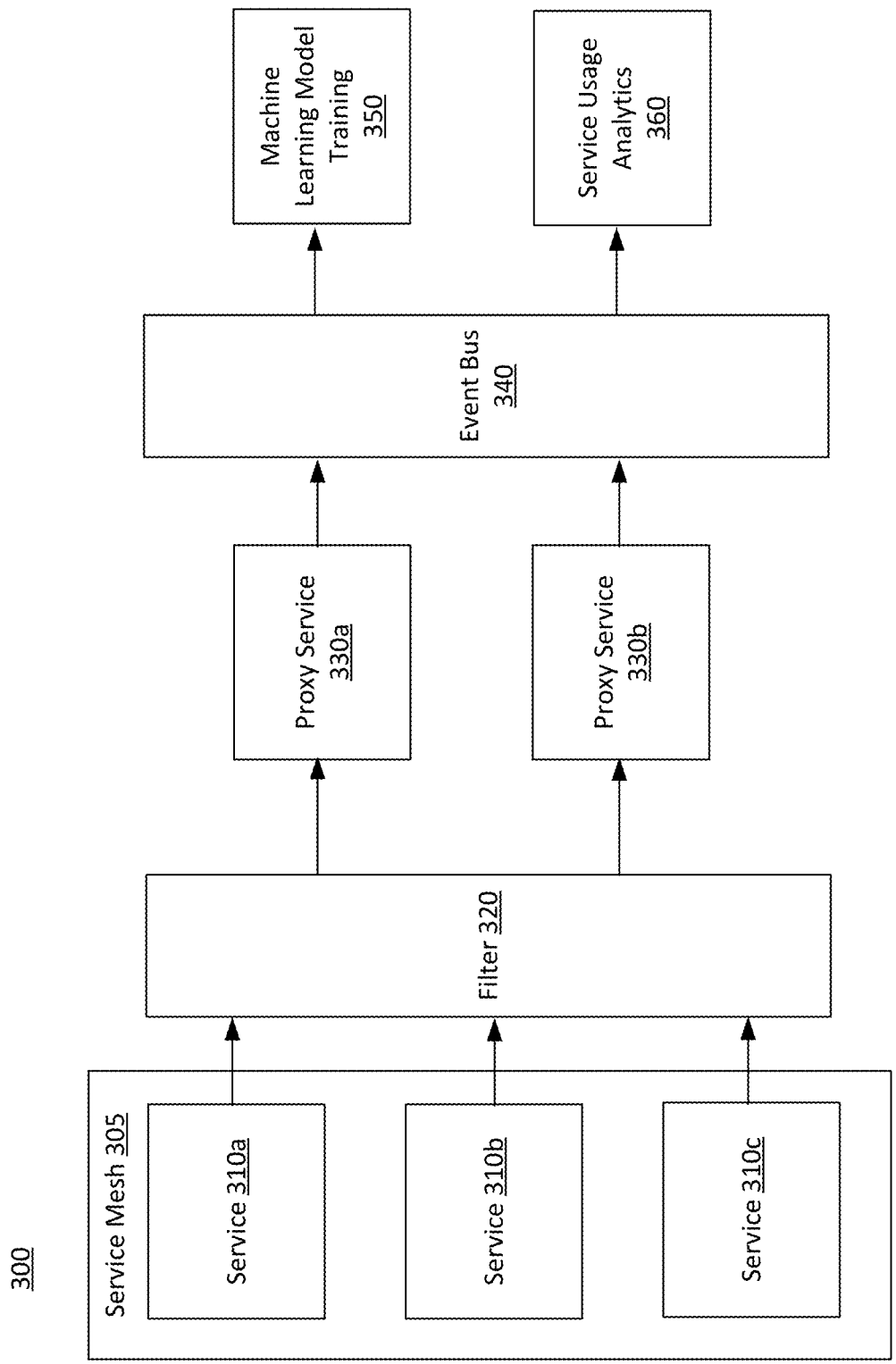
FIG. 3 illustrates a component of the cloud-based application building system that captures data such as service requests/response/payloads according to an embodiment.

FIG. 3 illustrates a component of the cloud-based application building system that captures data such as service requests/response/payloads according to an embodiment. The service mesh decouples development and operations (dev and ops) via different control planes. This allows data issues to be managed independent of the operational issue thereby simplifying the overall development process.

The system 300 includes a plurality of service 310a, 310b, 310c, and so on that form a part of a service mesh 305. As different services 310 may execute in different pods or different servers of a cluster of servers. The traffic of the services is managed via one or more proxy services 330a, 330b (or a sidecar) that implement one or more filters 320 to capture different type of data (or events) in a manner that is decoupled from the applications. This allows the code of the proxy services 330a, 330b to be executed and implemented independent from the services 310. Accordingly, the services 310 can be executed and maintained independently without being affected by any new applications or new services being developed. The data captured using the filter 320 is sent to the proxy services 330a, 330b and further to the event bus 340 and is directed to components that perform tasks such as service usage analytics 360 and machine learning model training 350. The machine learning model training 350 component is used to generate machine learning models that may be further executed by a service or an application. The data that is generated by the service or application executing the machine learning models maybe used as a data source and provided as input to the service mesh 305. Similarly, a service or application may use the service usage analytics 360 module and generate reports or data that may be used a data source and provided as input to the service mesh 305.

A filter 320 includes instructions to identify events or data by specifying various attributes such as service name, type of data (e.g., data of a particular network layer or data transmitted by a particular network protocol or HTTP and so on. An enterprise may generate large amount of data of various types. As a result, finding different types of data can be a difficult task to service developers. The system allows all data to be treated as values on a data or event bus that can be extracted by applying specific filters. Different filters may be used by different applications or services being developed. Use of filters 320 allow data capture logic to be decoupled from the application logic. The data is filtered online in real time. Examples of filters include (1) Listener filter to access raw data and manipulate metadata during the initial connection phase. (2) Network filter to access and manipulate raw data. (3) HTTP Filter to operate at HTTP layer; optionally created by a final network filters.

Figure 4:
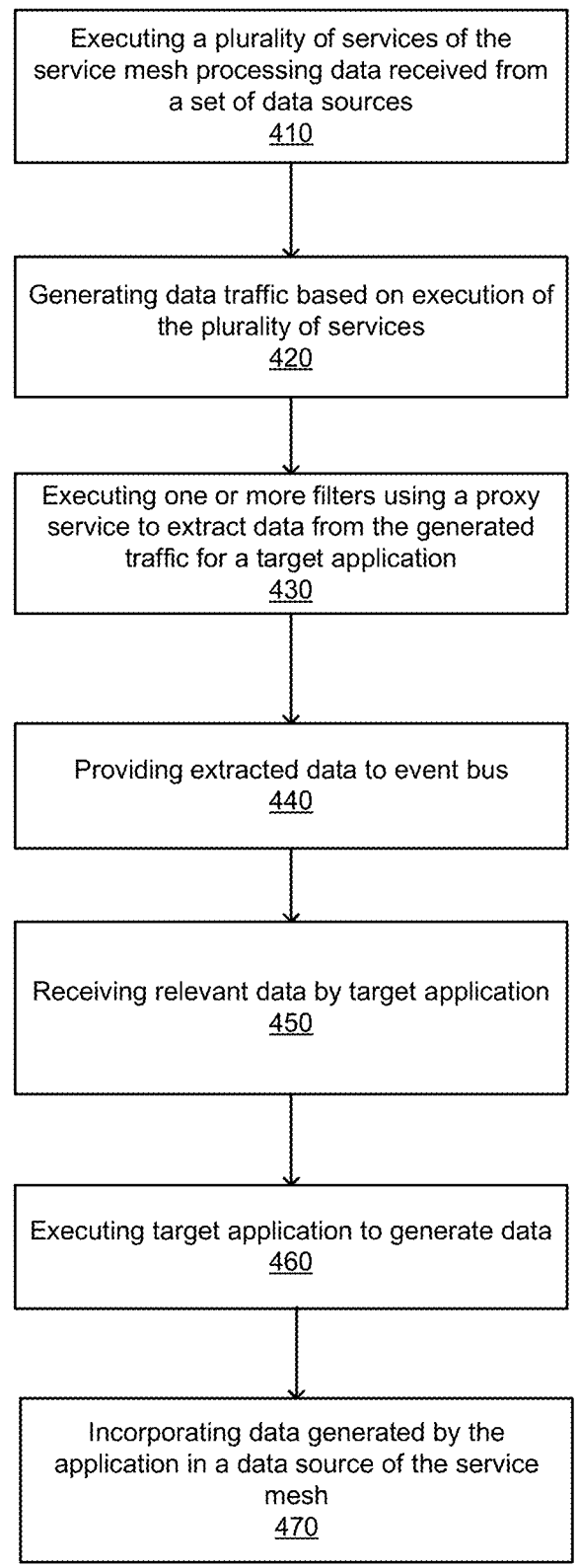
FIG. 4 shows a flowchart illustrating the process for extending a service mesh on a cloud platform, according to an embodiment.

FIG. 4 shows a flowchart illustrating the process for extending a service mesh on a cloud platform, according to an embodiment. The cloud platform executes 410 a plurality of services that form the service mesh. The services use data obtained from various data sources. The data sources may represent other applications that generate data, events associated with various systems, data stored in data stores such as databases, logs stored in log files, and so on. The data may be stored in database or data lakes. The services of the service mesh generate 420 traffic as a result of their execution. The traffic may be caused by interactions between various services, the interaction of various applications with the services, interaction of various users via client devices with the services, and so on. The traffic may represent requests representing API invocations with the services, results returned as a result of API invocations, and so on. A large organization may have several systems and services executing on one or more cloud platforms. As a result, large amount of traffic is generated by a service mesh of such an organization.

One or more filters are executed 430 using a proxy service to extract data from the generated traffic. The filters are configured to extract data that is relevant to a target application or a target service being built. In an embodiment, the target application comprises a machine learning based model. The proxy service represents a feature extraction proxy service that extract data used for building features provided as input to the machine learning model. The features extracted and provided as input to the machine learning model include the features extracted include a feature representing a measure of interactions with a service mesh, a feature representing a measure of interactions with a service, a feature representing a measure of interactions with a group of services, a feature f1 representing a measure m1 of interactions with a service and a feature f2 representing a measure of interactions with a group of services. In an embodiment, the machine learning model is a neural network and the proxy service extracts data and encodes the data in a format that can be provided as input to the neural network. The data extracted by the proxy service is used for training of the machine learning model. The use of a proxy service for extracting the data that is used for training the machine learning models provides separation of the services that are currently executing and new services that are being developed. Accordingly, the architecture of the system provides separation between dev and ops (i.e., development processes and operational processes). Without the separation provided by the proxy services, the developers may modify the existing services to extract the necessary information, thereby complicating maintenance and operation of the services.

In an embodiment, the proxy service provides 440 the extracted data to an event bus that supports event bus APIs. The target application being developed uses the event bus APIs to receive 450 the relevant data. Accordingly, multiple target applications or services may be developed simultaneously. Each target application invokes the right set of event bus APIs to extract the information that the target application needs.

When the development of the target application is completed, the target application may be added to the service mesh as a service. For example, if the target application comprises a machine learning model, once the training of the machine learning model is completed, the trained machine learning mode is incorporated in a service. The trained machine learning model is executed 460 to generate derived data. The derived data is incorporated 470 in a data source and provided as input to the service mesh. The target application is incorporated as a service of the service mesh. Accordingly, the target application adds the generated data to the traffic of the service mesh. The data generated by the target application may be used by other services. As a result, the system supports an extensible service mesh. The target application may be an analytics application that monitors various services and generates analytical reports based on the interactions associated with the services.

In an embodiment, a plurality of applications may be developed and added to the service mesh, each application based on a machine learning model. The applications may be interconnected such that an application A1 generated data that is provided as input to another application A1. In an embodiment, a hierarchy of machine learning models is configured in the service mesh. The hierarchy comprises a plurality of levels, each level comprising one or more machine learning models. The machine learning models executed at a particular level L1 generate data that is provided as input to a level L2 above level L1. Finally, the data generated by the root level is provided as the result of the hierarchy. To add a new machine learning based model to the hierarchy, a new machine learning based model is trained using data extracted from the traffic generated by the service mesh. Once the new machine learning based model is trained, the new machine learning based model is added to the hierarchy by configuring either (1) the new machine learning model to receive data generated by a machine learning model of the hierarchy or (2) by providing the output of the new machine learning model as input to a machine learning model of the hierarchy or both (1) and (2).

In an embodiment, the organization is a health care organization that includes various applications associated with health care, for example, applications that store and process various user interactions, applications that store health information of users, applications that track status of various users, applications that predict information for various users, for example, various recommendations and actions to be taken for patients. The machine learning based models may be trained to generate recommendations, for example, recommendation of when to reach out to a patient regarding medication, recommendation of a type of facility where the patient should be admitted, and so on.

In an embodiment, the target application uses a machine learning based model trained to predict a likelihood of a sudden increase in workload of the organization or web traffic directed to an online system of the organization. The proxy service extracts various features for providing to the machine learning based model including (1) features that represents attributes describing individual services and (2) features that represent attributes describing groups of services. The ability to monitor the traffic associated with the service mesh allows the system to extract features that describe an individual service as well as features that describe a group of services. For example, the proxy service extract messages of a particular type directed to a service, API invocations of particular type that were directed to the service, types of responses returned by the service, and so on. Furthermore, the system categories the messages and APIs into categories that are applicable to a plurality of services. For example, all messages sent via a particular network protocol, all API invocations that represent user interactions, all API requests that represent administrative operations, alerts generated by the services, and so on. The proxy service extracts from the network traffic, messages of a particular type that are directed to a set of services, for example, all services of a service mesh or a subset of services of a particular type. The machine learning model is trained to predict workloads, for example, to detect a potential spike in workload or a spike in requests received by the system based on these features. A service is added to the service mesh that executes the machine learning based model to predict workloads of the system. If the service predicts an expected increase in workload of the system, the service sends an alert to a system administrator to request additional computing resources from the cloud platform to handle the increase in workload, for example, a change in load on the system exceeding a threshold value. If the service predicts an expected decrease in workload of the system, the service sends an alert to a system administrator to request the cloud platform to reduce the allocated computing resources. In an embodiment, the machine learning based model predicts a score indicating an expected amount of increase or decrease in the workload. The system administrator can determine the amount of computing resources to be added or removed from the system based on the score. In an embodiment, the service automatically reconfigures the system to add or remove computing resources based on the predicted workload as determined by the machine learning based model. According to an embodiment, the system sends instructions to the cloud platform to increase computing resources associated with the system responsive to predicting an increase in load on the system exceeding a threshold value; alternatively, the system sends instructions to the cloud platform to decrease computing resources associated with the system responsive to predicting a decrease in load on the system exceeding a threshold value. The service adjusts the computing resources by invoking cloud platform APIs that allow computing resources to be configured. These include computing resources such as servers, memory resources, storage resources (such as databases or storage devices), and so on.

Figure 5A:
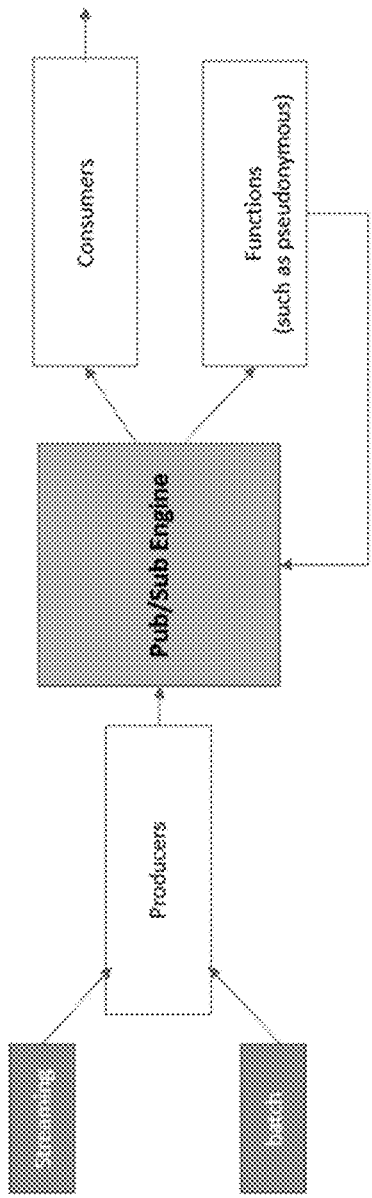
FIG. 5A illustrates a message exchange bus service used by the cloud-based application building system according to an embodiment.
Figure 5B:
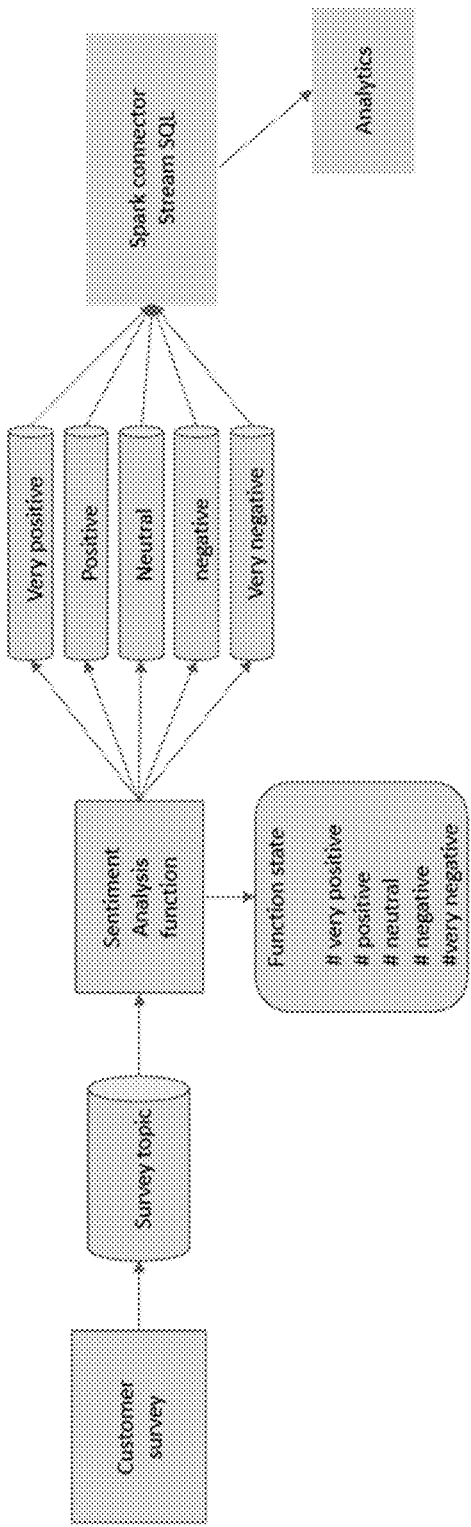
FIG. 5B shows an example use case based on the message exchange bus according to an embodiment.

FIG. 5A illustrates a message exchange bus service used by the cloud-based application building system according to an embodiment. The system includes data and event pipelines and performs service orchestration and notification. The system performs asynchronous processing and simplifies coding of decoupled applications. The system receives data from streaming channels and batch mode and provides it to a publish subscribe engine (event bus) to provide to consumers. The system also performs functions that transform the data, for example, pseudonymization of data. FIG. 5B shows an example use case based on the message exchange bus according to an embodiment. The application based on the example use case receives customer surveys, system captures survey topics, and performs sentiment analysis and send to a stream query language and performs analysis.

Figure 6:
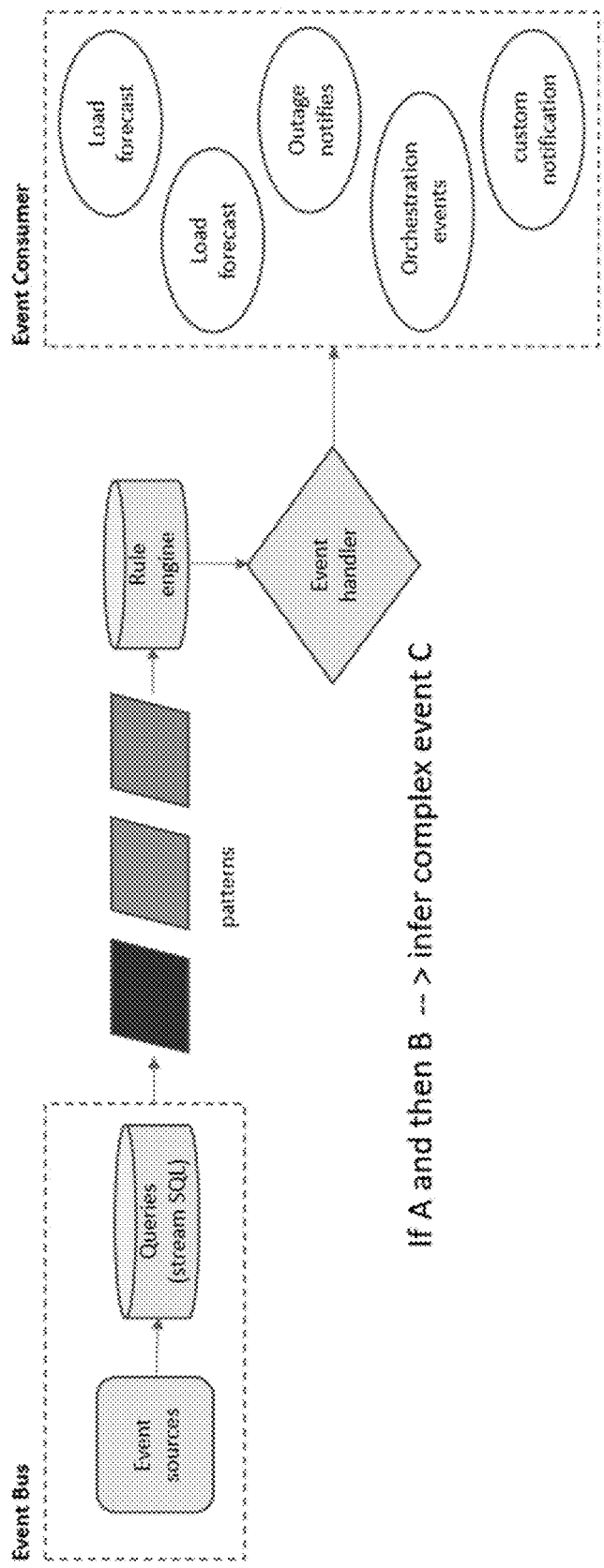
FIG. 6 illustrates a component for identifying event patterns and responding to them quickly, according to an embodiment.

FIG. 6 illustrates a component for identifying event patterns and responding to them fast, according to an embodiment. The system uses an event bus that receives events from event sources. The system uses stream queries to extract/filter events. The selected events satisfy specific patterns. A rule engine executes rules to generate complex events by composing input events. These events are provided as input to event consumers that perform various types of forecasts for example, load forecast, outage notifications, and so on.

Figure 7:
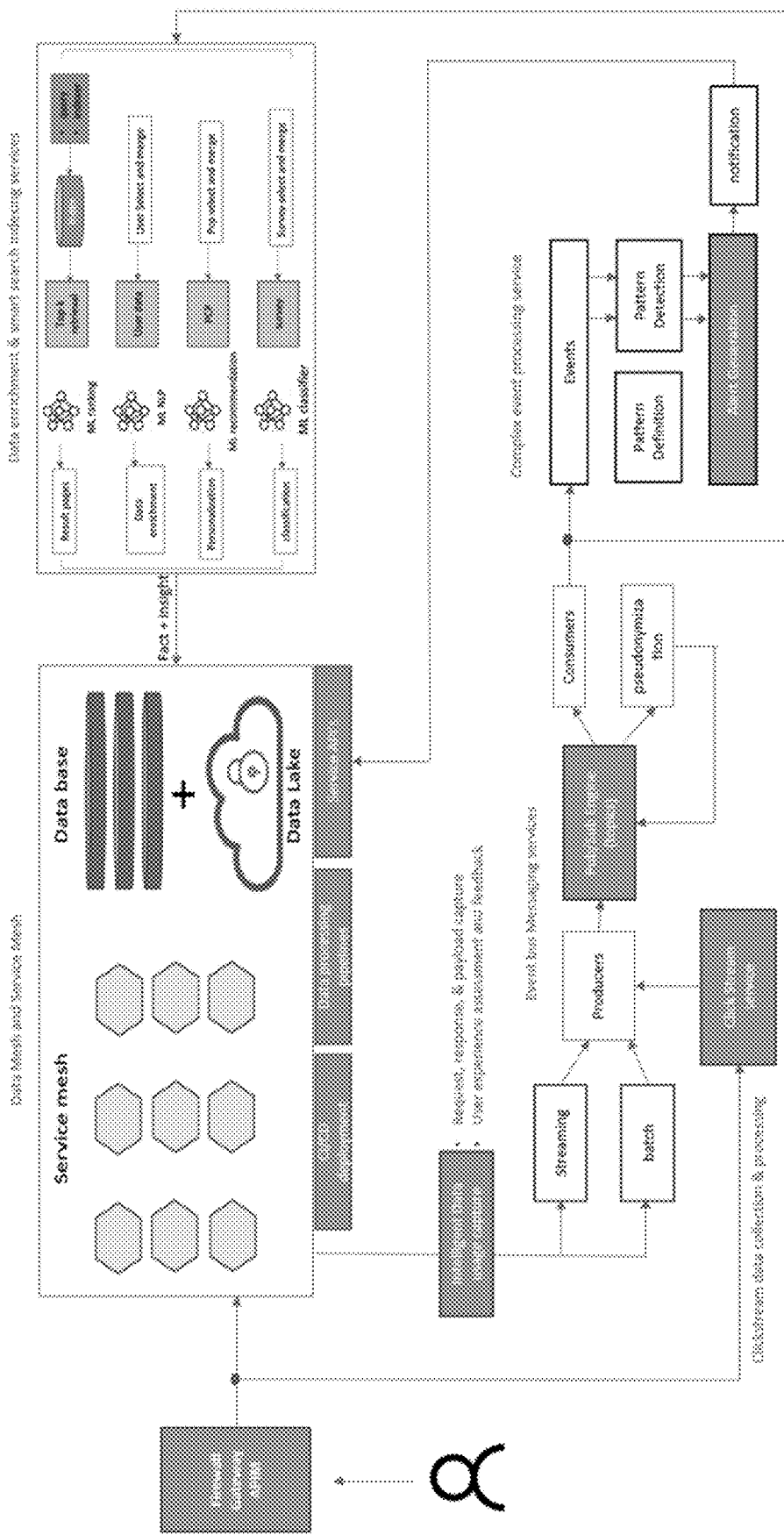
FIG. 7 shows the various components of the cloud-based application building system and their interactions according to an embodiment.

FIG. 7 shows the various components of the cloud-based application building system and their interactions according to an embodiment. The system includes data mesh and service mesh. The system implements CI/CD pipelines and data pipelines and service APIs. The system performs intelligent data capture that provides data to event bus. The data from event bus is processed by smart search indexes and machine learning models to generate insights that are fed back as input to the data mesh/service mesh.

Example Application Developed Using the Cloud-Based Application Building System

Figure 8:
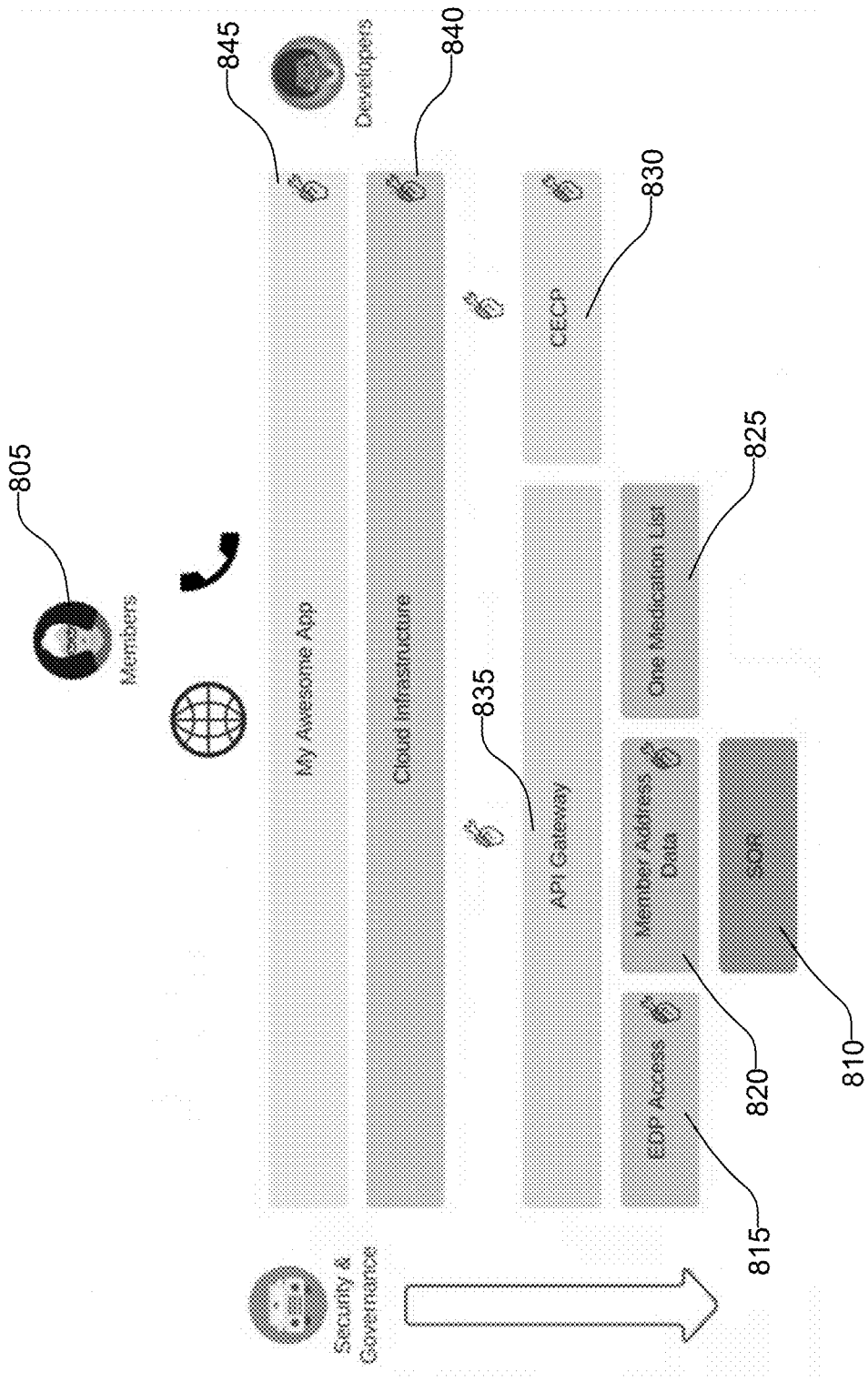
FIG. 8 illustrates the process followed by a developer for developing an example application.

FIG. 8 illustrates the process followed by a developer for developing an example application. The application being developed allows end users 805 to interact with a website and a communication channel, for example, a phone system of an organization. The developer accesses the system of records 810 processed by the application. The developer needs to integrate the application with a communication channel such as phone system 830. The developer may have to integrate the application to a data pipeline 815, member address data 820, medication list 825 of member, and API gateway 835, a user interface 845, and the cloud infrastructure 840. As a result, a developer needs to integrate with several different components and make them interact with each other to successfully develop the application.

Figure 9:
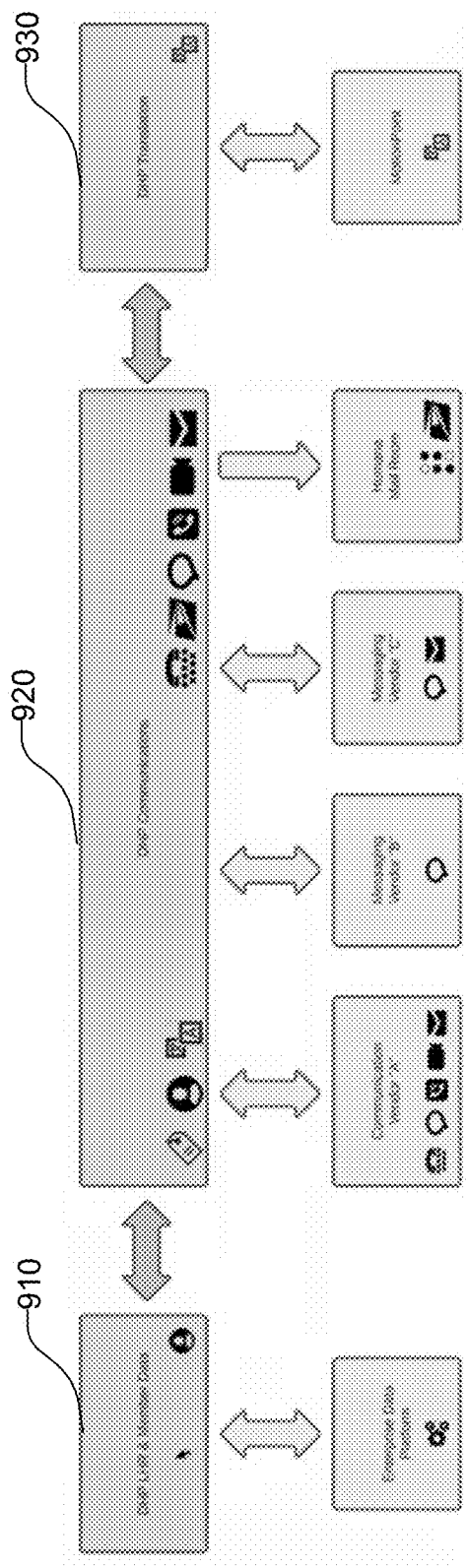
FIG. 9 illustrates an example application that may be developed using the cloud-based application building system, according to an embodiment.

FIG. 9 illustrates an example application that may be developed using the cloud-based application building system, according to an embodiment. The application includes a data access component 910, a communication component 920 that interacts with various communication channels, and a language translation component 930 that allows the system to translate from a language used by a user to other languages that may be used by the system or by other users. These various components interact with each other.

Figure 10:
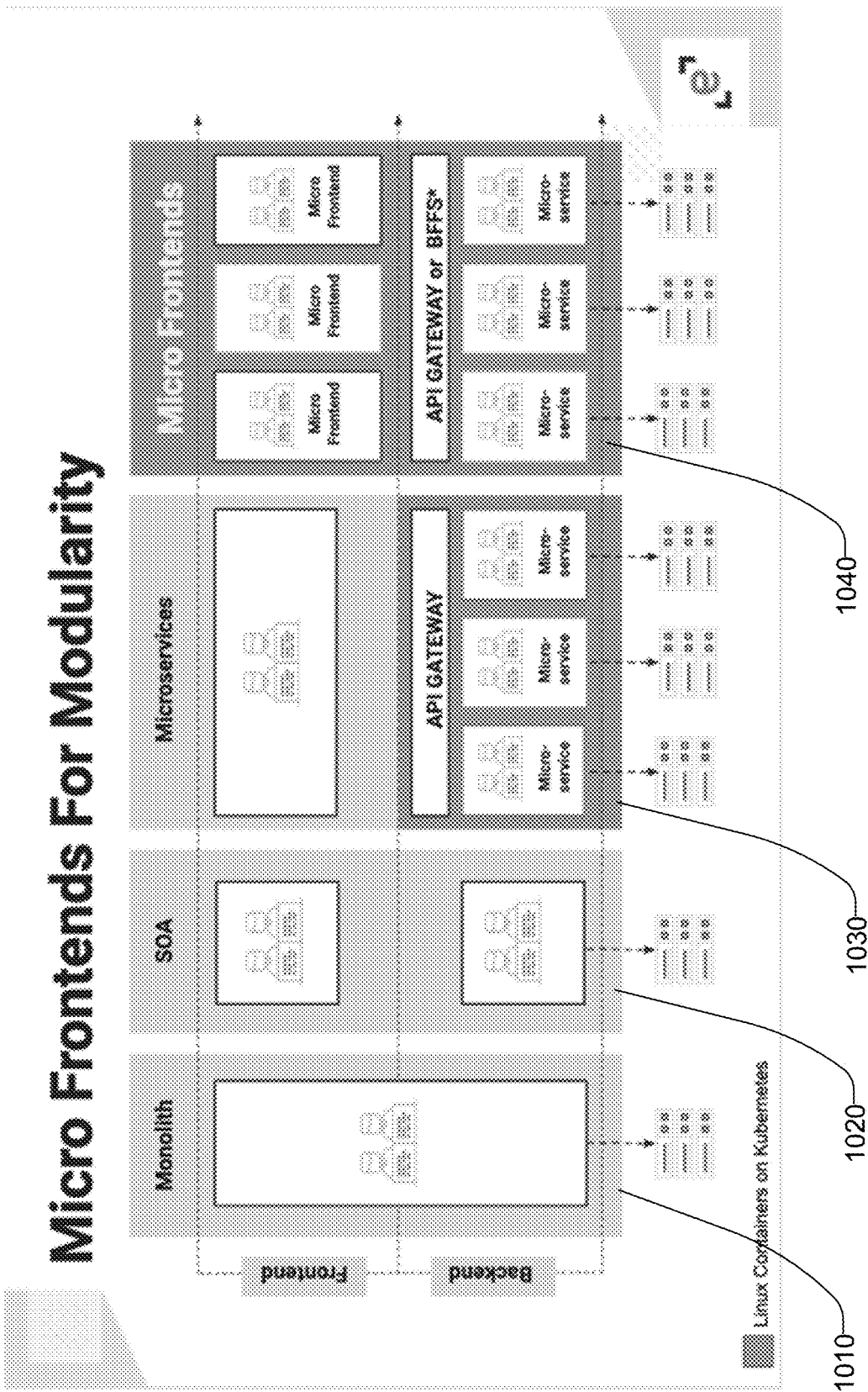
FIG. 10 shows how the cloud-based application building system compares with other platforms.

FIG. 10 shows how the cloud-based application building system compares with other platforms. A monolithic application 1010 combines all features into a single monolithic architecture. A service oriented architecture 1020 (SOA) that breaks up the application into a few large components. A microservices based architecture 1030 splits the application into finer grained services compared to SOA.

The microservices provide APIs that are used to invoke functionality in the microservices. An application architecture 1040 invokes microservices in the backend and uses microfrontend use interfaces (UIs) in the front end. The microfrontend UIs can be combined by developers rapidly to build different types of applications. The microfrontend components present the consumer view of the application and the microservices present the provider view of the functionality used by the application.

Additional Considerations

It is to be understood that the Figures and descriptions of the present invention have been simplified to illustrate elements that are relevant for a clear understanding of the present invention, while eliminating, for the purpose of clarity, many other elements found in a multi-tenant system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of the above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for maintaining services on a cloud platform, the method comprising:
configuring a service mesh, said service mesh comprising a plurality of microservices on a cloud platform, the plurality of microservices receiving data from a respective set of one of more data sources (collectively, "plurality of data sources");
initializing a new service for the service mesh based on a machine learning based model, the initializing comprising, initializing parameters of the machine learning based model;
executing one or more proxy services on the cloud platform, each proxy service configured to:
extract feature data from the plurality of data sources using one or more filters, each filter being specific to said plurality of microservices and configured to extract a respective subset of data from the respective set of one or more of data sources for the respective one of the plurality microservices;
provide the extracted feature data for training the machine learning based model; and
train the machine learning based model based on the extracted feature data;
configuring the new service based on the trained machine learning based model, wherein the new service generates derived data based on execution of the trained machine learning based model; and
extending the service mesh by including the configured new service in the service mesh such that the configured new service is one of the plurality of microservices and including the derived data in a data source of the plurality of data sources.

2. The computer-implemented method of claim 1, wherein the machine learning based model is configured to predict a score indicating a measure of expected load on a system associated with the service mesh.

3. The computer-implemented method of claim 2, wherein the feature data comprises a feature representing a measure of interactions with a service.

4. The computer-implemented method of claim 2, wherein the feature data comprises a feature representing a measure of interactions with a group of services.

5. The computer-implemented method of claim 2, wherein the feature data comprises a first feature representing a first measure of interactions with a service and a second feature representing a second measure of interactions with a group of services.

6. The computer-implemented method of claim 2, further comprising:
sending an alert responsive to predicting a change in load on the system exceeding a threshold value.

7. The computer-implemented method of claim 2, further comprising:
sending instructions to the cloud platform to reconfigure computing resources associated with the system responsive to predicting a change in load on the system exceeding a threshold value.

8. The computer-implemented method of claim 2, further comprising:
sending instructions to the cloud platform to increase computing resources associated with the system responsive to predicting an increase in load on the system exceeding a threshold value.

9. The computer-implemented method of claim 2, further comprising:
sending instructions to the cloud platform to decrease computing resources associated with the system responsive to predicting a decrease in load on the system exceeding a threshold value.

10. The computer-implemented method of claim 1, wherein a service from the plurality of microservices of the service mesh acts as a data source from the plurality of data sources.

11. A non-transitory computer readable storage medium storing instructions that when executed by a computer processor cause the computer processor to perform steps comprising:
configuring a service mesh, said service mesh comprising a plurality of microservices on a cloud platform, the plurality of microservices receiving data from a respective set of one or more data sources (collectively, a "plurality of data sources");
initializing a new service for the service mesh based on a machine learning based model, the initializing comprising, initializing parameters of the machine learning based model;
executing one or more proxy services on the cloud platform, each proxy service configured to:
extract feature data from the plurality of data sources using one or more filters, each filter being specific to said plurality of microservices and configured to extract a respective subset of data from the respective set of one or more plurality of data sources for the respective one of the plurality of microservices;
provide the extracted feature data for training the machine learning based model; and
train the machine learning based model based on the extracted feature data;
configuring the new service based on the trained machine learning based model, wherein the new service generates derived data based on execution of the trained machine learning based model; and
extending the service mesh by including the configured new service in the service mesh such that the configured new service is one of the plurality of microservices and including the derived data in a data source of the plurality of data sources.

12. The non-transitory computer readable storage medium of claim 11, wherein the machine learning based model is configured to predict a score indicating a measure of expected load on a system associated with the service mesh.

13. The non-transitory computer readable storage medium of claim 12, wherein the feature data comprises a feature representing a measure of interactions with a service.

14. The non-transitory computer readable storage medium of claim 12, wherein the feature data comprises a feature representing a measure of interactions with a group of services.

15. The non-transitory computer readable storage medium of claim 12, wherein the feature data comprises a first feature representing a first measure of interactions with a service and a second feature representing a second measure of interactions with a group of services.

16. The non-transitory computer readable storage medium of claim 12, further comprising:
sending an alert responsive to predicting a change in load on the system exceeding a threshold value.

17. The non-transitory computer readable storage medium of claim 12, further comprising:
sending instructions to the cloud platform to reconfigure computing resources associated with the system responsive to predicting a change in load on the system exceeding a threshold value.

18. The non-transitory computer readable storage medium of claim 12, further comprising:
sending instructions to the cloud platform to increase computing resources associated with the system responsive to predicting an increase in load on the system exceeding a threshold value.

19. The non-transitory computer readable storage medium of claim 12, further comprising:
sending instructions to the cloud platform to decrease computing resources associated with the system responsive to predicting a decrease in load on the system exceeding a threshold value.

20. A computer system comprising:
a computer processor; and
a non-transitory computer readable storage medium storing instructions that when executed by a computer processor cause the computer processor to perform steps comprising:
configuring a service mesh, said service mesh comprising a plurality of microservices on a cloud platform, the plurality of microservices receiving data from a respective set of one or more data sources (collectively, a "plurality of data sources");
initializing a new service for the service mesh based on a machine learning based model, the initializing comprising, initializing parameters of the machine learning based model;
executing one or more proxy services on the cloud platform, each proxy service configured to:
extract feature data from the plurality of data sources using one or more filters, each filter being specific to said plurality of microservices and configured to extract a respective subset of data from the respective set of one or more plurality of data sources for the respective one of the plurality of microservices;
provide the extracted feature data for training the machine learning based model; and
train the machine learning based model based on the extracted feature data;
configuring the new service based on the trained machine learning based model, wherein the new service generates derived data based on execution of the trained machine learning based model; and
extending the service mesh by including the configured new service in the service mesh such that the configured new service is one of the plurality of microservices and including the derived data in a data source of the plurality of data sources.

\* \* \* \* \*